June 27, 1967     W. P. LOCKSHAW     3,327,847
OBJECT COUNTING AND DISCRIMINATING DEVICE
Filed April 7, 1965     7 Sheets-Sheet 1

INVENTOR.
WILLIAM PAUL LOCKSHAW
BY
Ralph F. Crandell
ATTORNEY

June 27, 1967 W. P. LOCKSHAW 3,327,847
OBJECT COUNTING AND DISCRIMINATING DEVICE
Filed April 7, 1965 7 Sheets-Sheet 2

INVENTOR.
WILLIAM PAUL LOCKSHAW
BY
Ralph F. Crandell
ATTORNEY

June 27, 1967 W. P. LOCKSHAW 3,327,847
OBJECT COUNTING AND DISCRIMINATING DEVICE
Filed April 7, 1965 7 Sheets-Sheet 3

INVENTOR.
WILLIAM PAUL LOCKSHAW
BY
Ralph F. Crandell
ATTORNEY

June 27, 1967   W. P. LOCKSHAW   3,327,847
OBJECT COUNTING AND DISCRIMINATING DEVICE
Filed April 7, 1965   7 Sheets-Sheet 4
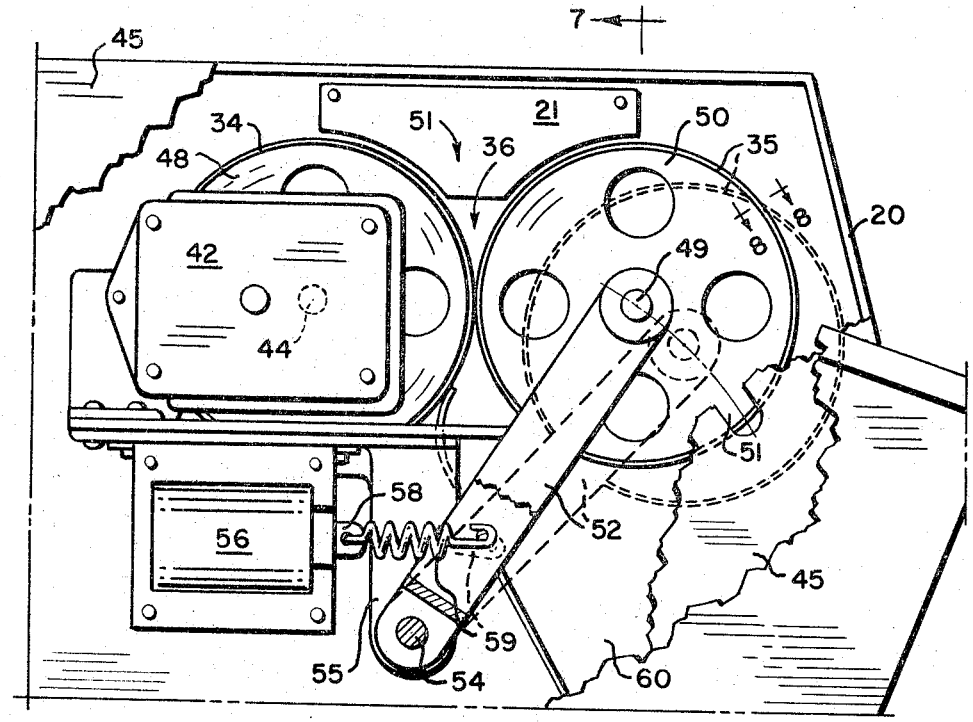
Fig. 6
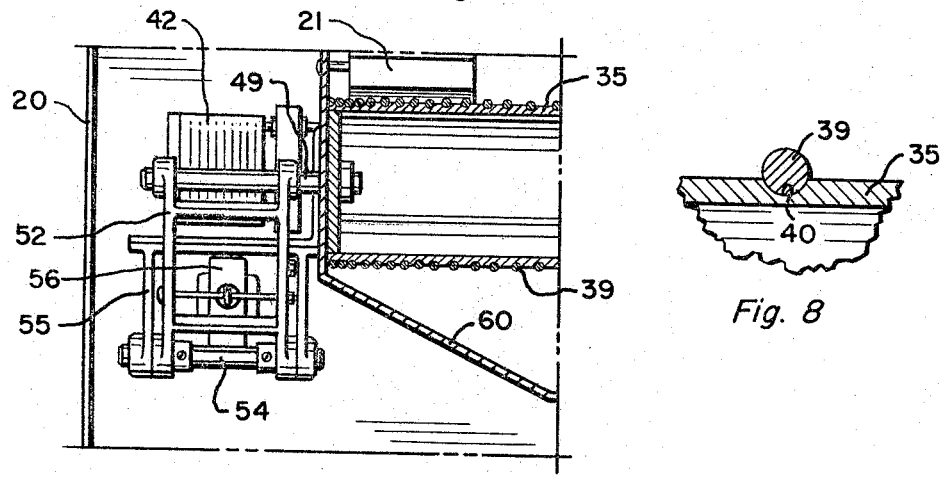
Fig. 7
Fig. 8
INVENTOR.
WILLIAM PAUL LOCKSHAW
BY
Ralph F. Crandell
ATTORNEY INVENTOR.
WILLIAM PAUL LOCKSHAW
BY
Ralph F. Crandell
ATTORNEY

WAVE FORMS AND TIME COINCIDENCE

INVENTOR.
WILLIAM PAUL LOCKSHAW

United States Patent Office 3,327,847
Patented June 27, 1967

3,327,847
OBJECT COUNTING AND DISCRIMINATING DEVICE
William P. Lockshaw, Canoga Park, Calif., assignor to The Marick Corporation, Denver, Colo., a corporation of Colorado
Filed Apr. 7, 1965, Ser. No. 446,341
8 Claims. (Cl. 209—74)

ABSTRACT OF THE DISCLOSURE

A tablet counter utilizing two helically threaded rotating cylinders to convey a line of tablets to a comparing and counting station. The tablets are compared to a standard by a photocell actuated circuit and a counter is actuated by the photocell circuit to count the number of tablets meeting the standard.

BACKGROUND, SUMMARY AND OBJECTS OF THE INVENTION

The present invention relates to an electro-mechanical object counting and discriminating device, and more particularly to an object counting device adapted for use as a pharmaceutical counter for use by druggists and drug houses in filling prescriptions involving a prescribed number of pills or tablets, which device counts a select number of pills or tablets and which rejects and does not count broken pills and tablets.

It is the principal object of the present invention to provide a mechanism for comparing individual ones of a plurality of discrete objects with a predetermined standard, and for counting and segregating those objects which, upon such comparison, meet said standard within predetermined limits.

More specifically, it is an object of the invention to count and segregate individual ones of a plurality of objects which are of a predetermined configuration.

Another object of the present invention is to provide a device of the above character which is capable of receiving a supply of discrete objects, comparing each object in turn with a preselected standard, and counting those objects which compare favorably with said standard.

Still another object of the present invention is to provide a mechanism having the above characteristics wherein a number of objects meeting a pre-established standard may be counted and segregated. A related object is to provide a mechanism of the above type which rejects objects not meeting said standard.

A further object is to provide a mechanism of the foregoing character in which the comparative action is substantially instantaneous and which operates automatically, rapidly and efficiently with a minimum of attention.

A more detailed object of the present invention is to provide a mechanism of the foregoing character which is compact, has a minimum of working parts, is easily constructed and serviced, and is reliable and accurate in its operation.

More specifically, it is an object of the invention to provide a pill or tablet counter which, because of its speed, accuracy and reliability, finds particular, but not necessarily exclusive, utility in the pharmaceutical and drug industry.

DESCRIPTION OF THE DRAWINGS

FIG. 6 is an enlarged fragmentary end view of a portion of the conveyor actuating mechanism shown in FIG. 5 with parts broken away for clarity.

FIG. 7 is a section view taken substantially in the plane of line 7—7 on FIG. 6.

FIG. 8 is a fragmentary section view taken substantially in the plane of line 8—8 on FIG. 6 and showing in detail the cross section of a rib on a conveyor cylinder.

DESCRIPTION OF THE PREFERRED EMBODIMENT

Figure 1:
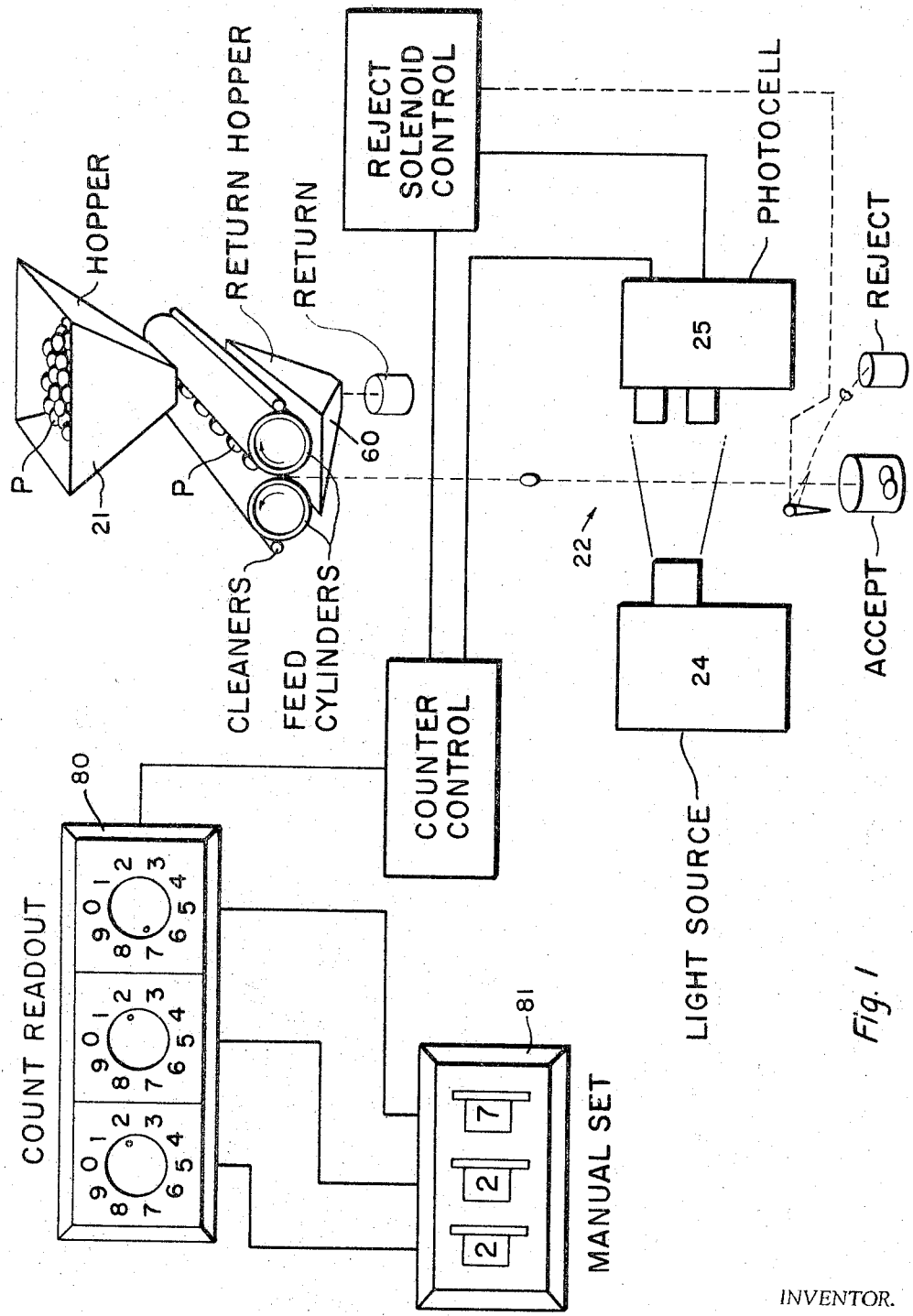
FIGURE 1 is a schematic diagram of one form of apparatus embodying the present invention.

The counter discriminator mechanism embodying the present invention is capable of discriminating and counting discrete objects which measure up to a specific standard. The standard may be selected and established in any desired way. For example, the standard may be an object selected at random from the objects themselves, or may be a separately established standard constructed and utilized specifically for that purpose. In the present form of the invention, a series of the objects to be counted and sorted, such as pills or tablets, are placed into a hopper at one end of the machine, and the machine is started. The first object to pass through the machine constitutes the standard against which all subsequent objects are compared. This object may either be selected at random from the hopper or may be deliberately placed in the machine in a position to be observed and counted as the standard.

Having initially established a standard, the machine then operates to compare each subsequent object with that standard. For example, in the sorting and counting of pills or tablets, a pharmaceutical house ordinarily counts and separates tablets by hand. The "good" tablets are separated by "eye" from broken or foreign tablets. The pharmacist then must count each "good" tablet in order to establish a selected or prescribed batch.

With the present invention, a pharmacist or other person interested in counting a discrete number of objects, such as tablets, places a batch of the objects in a hopper and sets the preselect counter on the machine for the count desired. This invention then proceeds to segregate broken objects and accept and count only those objects meeting the selected standard. When the machine observes a broken object, its discriminatory features take over, and this broken object is rejected and not counted. When the desired count, as preset into the machine, has been obtained, the machine operation ceases. In the form disclosed, all remaining objects in the hopper and in process in the system are discharged back to a supply source. The machine must then be reset before making a subsequent run. Alternatively, it will be appreciated that by a simple switch mechanism, the machine can be set to run any given number of batches consecutively. That is, the machine might be so adjusted as to count out twenty separate batches of ten objects each before the supply from the hopper is dumped to a return hopper. In the mechanism shown, however, when a batch, say of ten objects, has been counted, the machine operation ceases and all remaining objects are dumped to a supply hopper.

In its broadest aspects, the machine is capable of accepting a plurality of discrete objects, aligning said objects into a continuous single file array, and successively passing each object in the array past a sensing station which, in the present instance, comprises a photocell, at which station each object is observed and compared to a standard. Objects meeting the standard are accepted and counted, and objects failing to meet the standard are rejected. The machine described herein has been constructed to accept any object of equal or greater size than the standard, such as a whole pill, and to reject any object smaller than the standard, such as a broken pill. It will be appreciated, however, that with simple modifications, the machine may be adjusted to discriminate on the basis of larger rather than smaller size. Also, with certain adjustment, the machine may be constructed to distinguish color, shape, or any other physical property. In essence, the present invention contemplates the establishment of a standard for a discrete object, the comparison with that standard of subsequent objects, and the acceptance and counting of those meeting the selected standard.

The mechanical portions of the present invention comprise essentially an organization of components facilitating the passing of individual discrete objects, such as pills, tablets, capsules, or the like, past an observation point at which some physical characteristic of the object is observed. To this end, the mechanism comprises a frame or housing 20 carrying at its upper end a hopper 21 for receiving a supply of discrete objects P, such as pills, tablets, capsules, or any other particle to be examined and counted. At the opposite end of the frame 20 from the housing 21 there is mounted an observation station, indicated generally at 22 which, in the present instance, is comprised of a photocell organization, including a light source 24 and photosensitive plate or photocell 25. From the hopper, objects are conveyed in a single line array to the observation station where they pass serially between the light source 24 and photocell 25. As each object P passes between the light source and photocell, it blocks an amount of light proportional to its cross-sectional area, and this in turn causes the photocell output to change by the same proportion. This output is then utilized to actuate the counting and discriminating operation.

Figure 2:
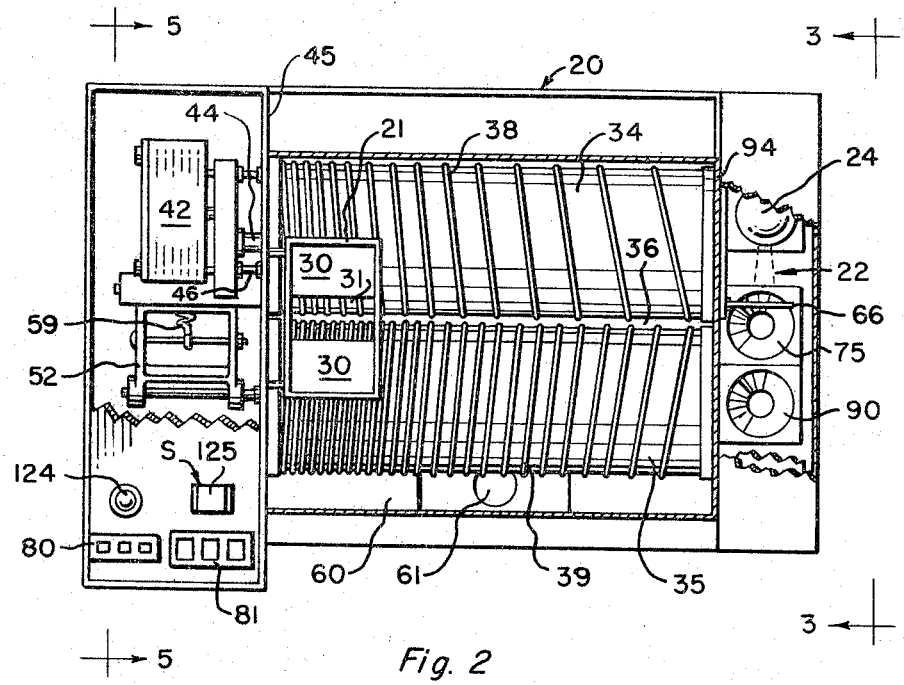
FIG. 2 is a plan view, with parts broken away for clarity, of one form of apparatus embodying the present invention.
Figure 3:
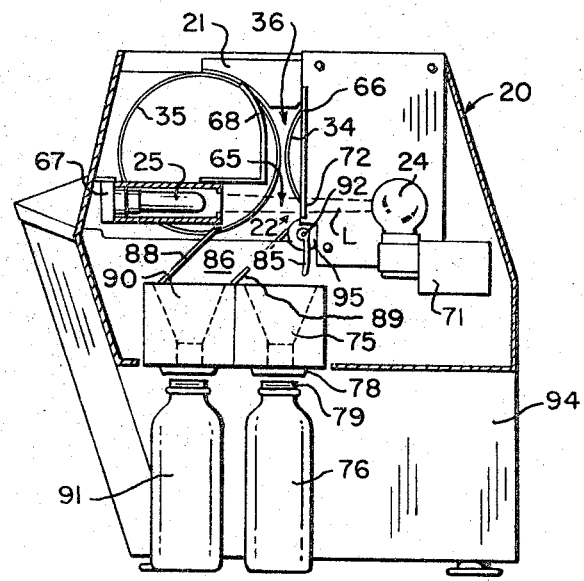
FIG. 3 is an end view of the apparatus shown in FIG. 2, but with the outer housing wall removed, showing the discharge end of the conveyor cylinders and the photocell mechanism.
Figure 4:
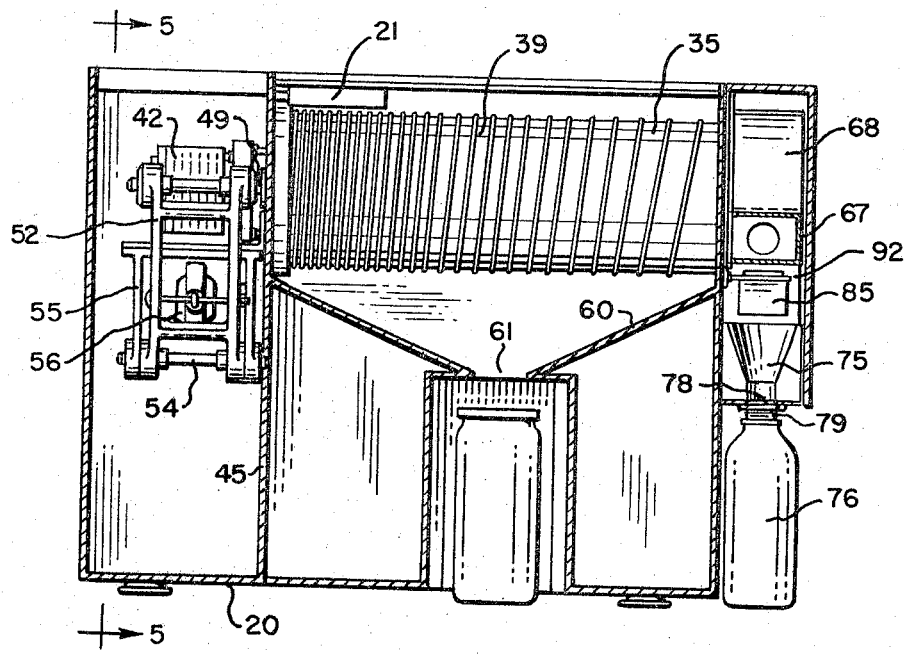
FIG. 4 is a front elevation view of the apparatus shown in FIG. 2, but with the outer housing wall removed and parts broken away for clarity.
Figure 5:
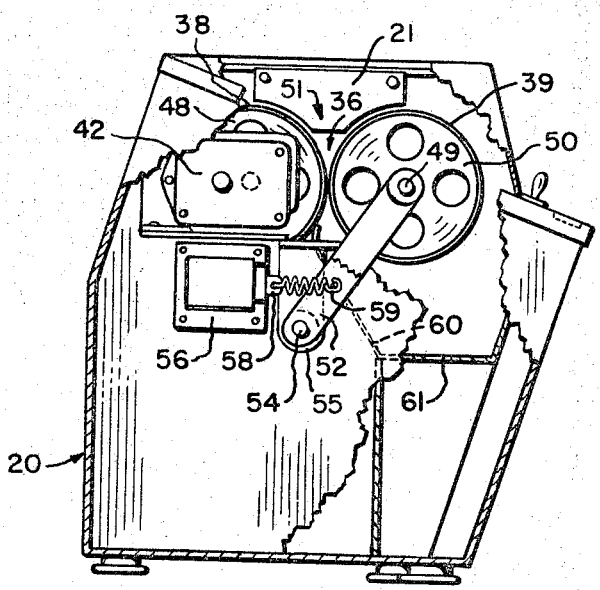
FIG. 5 is an end view of the apparatus shown in FIG. 2, but with the outer housing wall removed, showing the conveyor actuating and drive mechanism.

In order to convey objects P from the hopper 21 to the observation station in a single line array so that each individual object may be examined, counted or rejected in its turn, means are provided for removing objects, one at a time, from the hopper, aligning each of the objects into an array and conveying the same to the observation station where each object falls between the light source and photocell. For this purpose, the hopper 21 is formed at its lower end with inwardly sloping panels 30 terminating centrally of the hopper in an elongated discharge opening 31 positioned directly above and in alignment with a channel 36 defined between two tangentially disposed conveyor feed cylinders or rollers 34, 35. These feed cylinders 34, 35, are mounted for rotation in opposite directions in such a manner that the cylinder surfaces defining the channel therebetween move upwardly and away from each other. In other words, the surfaces of the two tangentially juxtaposed feed cylinders 34, 35 define together a V-shaped channel 36, the walls of which move in continuously diverging directions as the cylinders rotate. To carry a pellet from the hopper 21 along the channel 36, each cylinder has a screw thread 38, 39 respectively formed on the surface thereof. In the modification shown, these threads are formed by cutting a spiral groove 40 (FIG. 8), of the desired pitch, in the surface of each cylinder, and then wrapping each cylinder with a thin rod of formable material so that said rod is received in the groove and forms the desired thread. In FIGS. 2 and 3, the feed cylinders 34, 35 are shown slightly separated for clairity in illustration. In operation, the rollers must be spaced apart an amount less than the smallest object to be handled, and will be in substantially tangential contact as shown in FIGS. 5 and 6.

Discrete objects received in the groove 36 are caused to traverse therealong by the threads 38, 39, one of which, on cylinder 34 is a right hand thread, and the other of which, on cylinder 35, is a left hand thread. The threads on each of the cylinders co-operate to act as a continuous forward moving wall or rib to carry the objects, such as pills, in a continuous, single file array, from the hopper 21 to the observation station 22. In this manner, the externally threaded cylinders 34, 35 pick up discrete objects from the hopper, cause them to drop into a single file array, and convey such pills along the groove 36. To adapt the conveying cylinders for use with a wide variety of sizes and shapes of objects, the threads thereon desirably increase in pitch from the hopper end to the discharge end. In the structure shown, one cylinder 34 is provided with a single thread having a continuously increasing pitch ranging from zero inches to about two inches, whereas the other cylinder 35 has four such threads, each of continuously increasing pitch ranging from zero inches to about two inches. With cylinders of approximately three and one-half inches in diameter, and screw threads of the above dimension, the above described conveyor has been found to accommodate objects ranging in size from a minimum diameter of 0.01 inch to something slightly over 0.5 inch maximum diameter. By further varying pitch dimension, of course, even a wider range of object sizes could be accommodated.

For rotating the cylinders 34, 35, appropriate driving means are provided. One such means comprises a motor 42, having a shaft 44 drivingly engaging one of the cylinders 34 through an included transmission gear train (not shown). The motor 42 is mounted on an intermediate partition 45 within the housing 20 by suitable mounting screws 46, with the shaft 44 extending through the partition 45 into supporting engagement with an end plate 48 on the adjacent cylinder 34. The cylinder 34, being desirably formed of lightweight material, is supported in cantilever fashion on the shaft 44.

Provision is made in the embodiment shown herein for alternately separating the cylinders so as to allow any objects in the hopper or between the feed cylinders to be discharged from the mechanism, or to close the cylinders together in operative conveyor relationship. When in the latter position, the second or idler cylinder 35 is driven by the first or driver cylinder 34 by engagement between the threads 38, 39 respectively thereon, or alternatively, appropriate driving means, such as gears or a friction coupling may be provided on each of the cylinders 34, 35. The idler cylinder 35 has at the hopper end thereof a stub shaft 49 mounted on an end wall or bulkhead 50 of the cylinder and extending through an arcuate slot 51 defined in the intermediate partition 45.

Supporting the stub shaft 49, and thereby the cylinder 35, for arcuate swinging movement is an arm 52 journalling the shaft 49 at its upper end and pivotally mounted at its lower end on a shaft 54 extending between two downwardly extending portions of a generally U-shaped support bracket 55 secured to the intermediate partition 45. An idler cylinder driver, such as a solenoid 56 having an armature 58 is operatively connected to the swing arm 52 by any suitable flexible, yieldable coupling, such as a connecting spring 59. This spring 59 is attached at one end to the armature 56, and at its other end to a pin, bar or the like forming a part of the swing arm 52.

When the solenoid 56 is energized, as will be described hereinafter, the armature 58 is retracted and pulls on the spring 59 to swing the arm 52 and idler cylinder 35 carried thereby upwardly into driving relationship with the driver cylinder 34. Should an object become wedged between the cylinders, the spring 59 affords sufficient flexibility to allow the cylinders to separate slightly and allow the object to drop between them. When the conveying operation is completed, the conveyor cylinder solenoid 56 is de-energized and the idler cylinder drops, of its own weight, and the weight of the arm 52, away from the driver cylinder 34, thereby leaving a substantial gap between the cylinders through which any objects remaining in the hopper or between the cylinders may fall. While the cylinders 34, 35 are preferably made of a material having a smooth surface to which small particles from the objects being counted will not adhere, if desired cleaning brushes, rollers or wipers may be provided to insure that the cylinder surfaces are clean. Moreover, these brushes or the like may be grounded to eliminate any electrostatic charges on the cylinder surfaces.

In order to collect and return these extra objects, a downwardly sloping hopper 60 is mounted within the housing 20 directly beneath the channel 36 defined between the cylinders 34, 35. The hopper 60 is provided with an opening 61 through the front wall of the housing 20 beneath which the user may place a suitable receptacle for catching objects discharged from the mechanism.

As each discrete object P, conveyed in the channel 36 defined between the conveyor cylinders 34, 35, reaches the end of the channel 36, it falls from between the cylinders through the observation station 22 where each one in turn is examined and compared to a standard. As pointed out above, a fixed standard may be utilized and built into the machine, or a seleced object may be allowed to pass first through the mechanism, or alternatively the first object removed from the hopper may be utilized as the standard. In the present embodiment, which finds particular utility for use in counting pharmaceutical pills or tablets, the last mentioned procedure is utilized, as it is the principal objective to count whole pills or tablets and reject broken ones. The operator need only observe and make sure that the first object is an unbroken one.

The objects are examined as they fall in a free fall vertical path, off of the end of the conveyor cylinders 34, 35, and through an observation channel 65. This channel 65 is defined by a guide 66 mounted on the end wall of the housing 20 adjacent the ends of the cylinders 34, 35, and the groove 36 defined therebetween, and by a photocell housing 67 also mounted on the end wall and spaced from the guide 65 on the opposite side of the groove 36. If desired, a second guide plate 68 may be provided extending upwardly from the end of the photocell housing parallel to guide 65. Moreover, the upper ends of one or both guides may be flared or curved outwardly away from the channel 65 to further facilitate the guiding of objects from the cylinders past the photocell. On the opposite side of guide plate 66 from the photocell housing is a lamp or light source 24 supported on a suitable mounting bracket 71, and arranged to direct a beam of light L through an opening 72 in guide plate 66 into the photocell housing 67 and onto the photocell 25 mounted therein.

As an object falls through the beam of light L, it blocks an amount of light proportional to its cross-sectional area. This changes the output of the photocell a proportionate amount, and this output change is fed to an appropriate electronic circuit (hereinafter described) by means of which the object is either accepted and counted or rejected, depending, in the present instance, on its cross-sectional area.

If the object meets the preselected standard, it is accepted and counted by the mechanism, and continues to fall in a vertical straight line path through the channel 65 into a funnel like guide 75 and thence into a bottle or other receptacle 76 disposed thereunder. To insure that objects which have been counted are not lost, the lower end of the funnel may be formed with threads 78 for engaging and holding a complementary threaded neck 79 on the receptacle 76.

As each object is counted, the count of objects is recorded by a visible counter 80 mounted on the housing 20. The number of objects desired in the receptacle 76 is preselected and set by a preselect counter mechanism 81, also mounted on the housing 20 adjacent the counter 80.

The counter and preselect mechanism 81 are correlated so that when counter 80 reaches the desired preset number, the entire mechanism is stopped, the cylinder solenoid 56 is de-energized, the idler cylinder 35 drops away from the driver cylinder 34, and all remaining objects in the machine fall into the discharge hopper 60 and through the opening 61 therein and are collected in a suitable supply container.

Should a broken object, or an object which does not meet the preselected standard, pass through the light beam L, the output of the photocell 25 will be such that the electronic circuit will cause the object to be rejected. For this purpose, a reject baffle 85 is positioned adjacent the channel 65 and is adapted to be swung across the channel to intercept the falling object and deflect it into a reject channel 86, defined by spaced downwardly and outwardly sloping panels 88, 89, and thence through a funnel-like member 90 into a reject receptacle 81. To this end, the reject baffle 85 is mounted on a shaft 92 pivotally mounted on an intermediate wall 94 supported in the housing 20, which shaft is rotated by a reject solenoid 95 also mounted on said intermediate wall 94.

To facilitate servicing and adjustment, the outer end wall panel on which the channel 65 is defined and on which the photocell and light source are mounted may be adapted for removal as a unit. The funnels may also be provided of varying sizes, in order to adapt the mechanism for use with various sizes of bottles or other receptacles.

Figure 10:
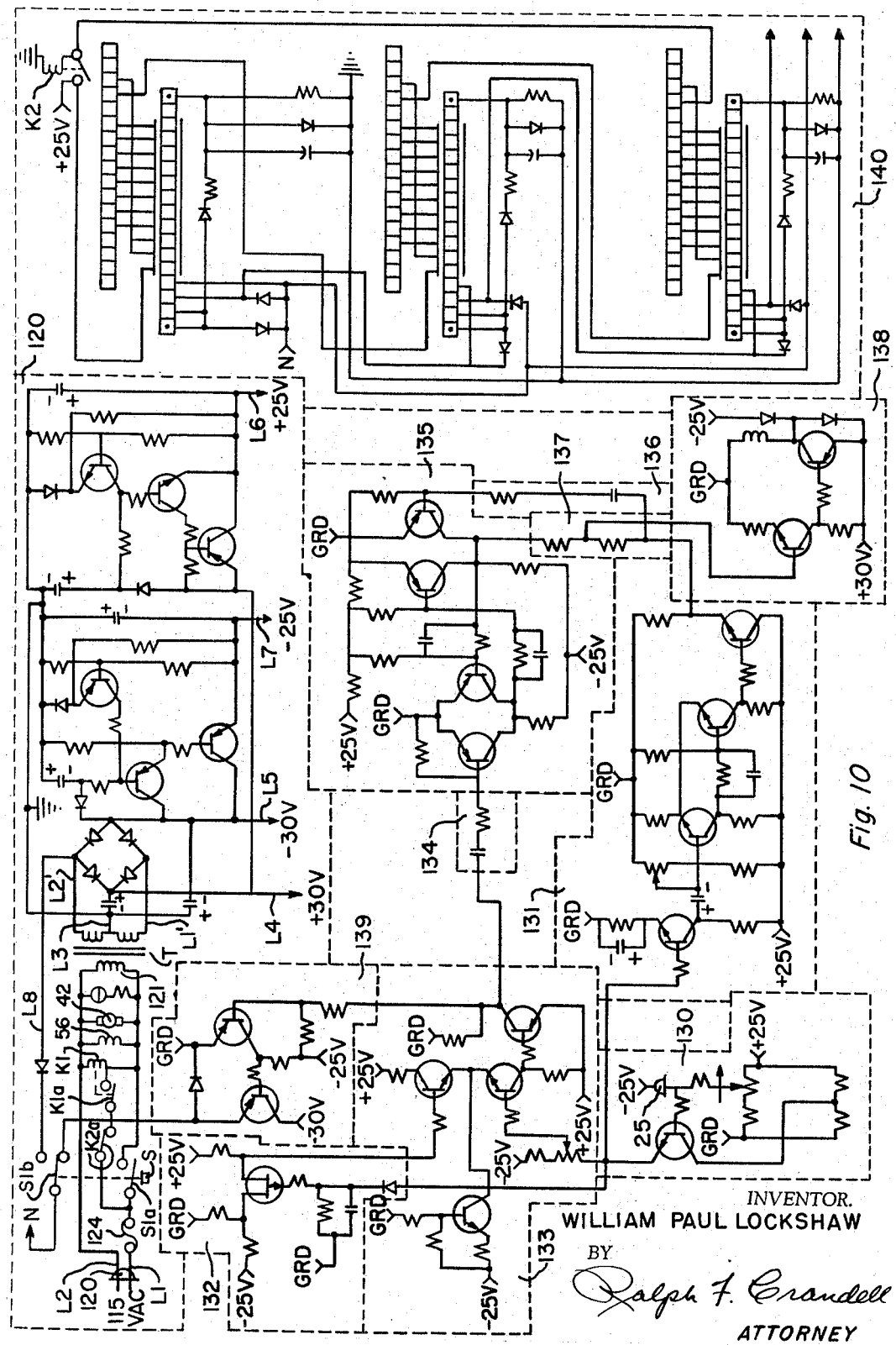
FIG. 10 is a schematic diagram of the circuit shown in FIG. 9.

Means are provided to operate the mechanism described above, establish a standard against which each object in the array formed therein may be compared, count those objects meeting the standard, reject those objects failing to meet the standard, stop the operation of the mechanism when a preset count has been reached, and return objects remaining in the device to a supply source. In accordance with one aspect of this invention, these means comprise a feed or conveyor cylinder drive and a discriminating and counting mechanism, organized of a plurality of electronic components operating the drive motor, feed cylinder solenoid 56, reject solenoid 95, and counter 80, all of which components are powered by an appropriate electrical power supply 120 energized from a 115-volt AC source through lines L–1 and L–2 (FIG. 10). Within the power supply circuit, the lines L–1 and L–2 lead to the primary coil 121 of a transformer with a secondary coil 122 having two output lines L–1' and L–2' and a center tap L–3. The secondary coil 122 of the transformer T supplies power, through lines L–1', L–2', L–3 to a DC power pack of conventional construction and affording, by lines L–4 and L–5, a plus-30-volt DC and a minus-30-volt DC supply, and by lines L–6 and L–7 a plus-25-volt DC and a minus-25-volt DC supply.

To start the operation of the counting and discriminating mechanism, a combination fuse and main switch 124 is closed and switch S, a momentary switch mounted on the housing 20, is pushed, thereby closing contact S–1a in line L–1 to energize contact solenoid K–1 to close contact K–1a and bypass the momentary switch S–1a to lock the circuit in the "ON" position. At the same time, feed cylinder solenoid 56 is energized to swing the cylinder 35 toward cylinder 34, and cylinder drive motor 42 is energized so that the cylinder begins to turn. Simultaneously a pilot light 125, in the present embodiment being incorporated as a part of start switch S, is turned on, the light being connected to ground from the minus-25-volt source L–7. Power being supplied to transformer T, lines L–4, L–5, L–6 and L–7 are energized, and the circuits are ready for operation.

Figure 9:
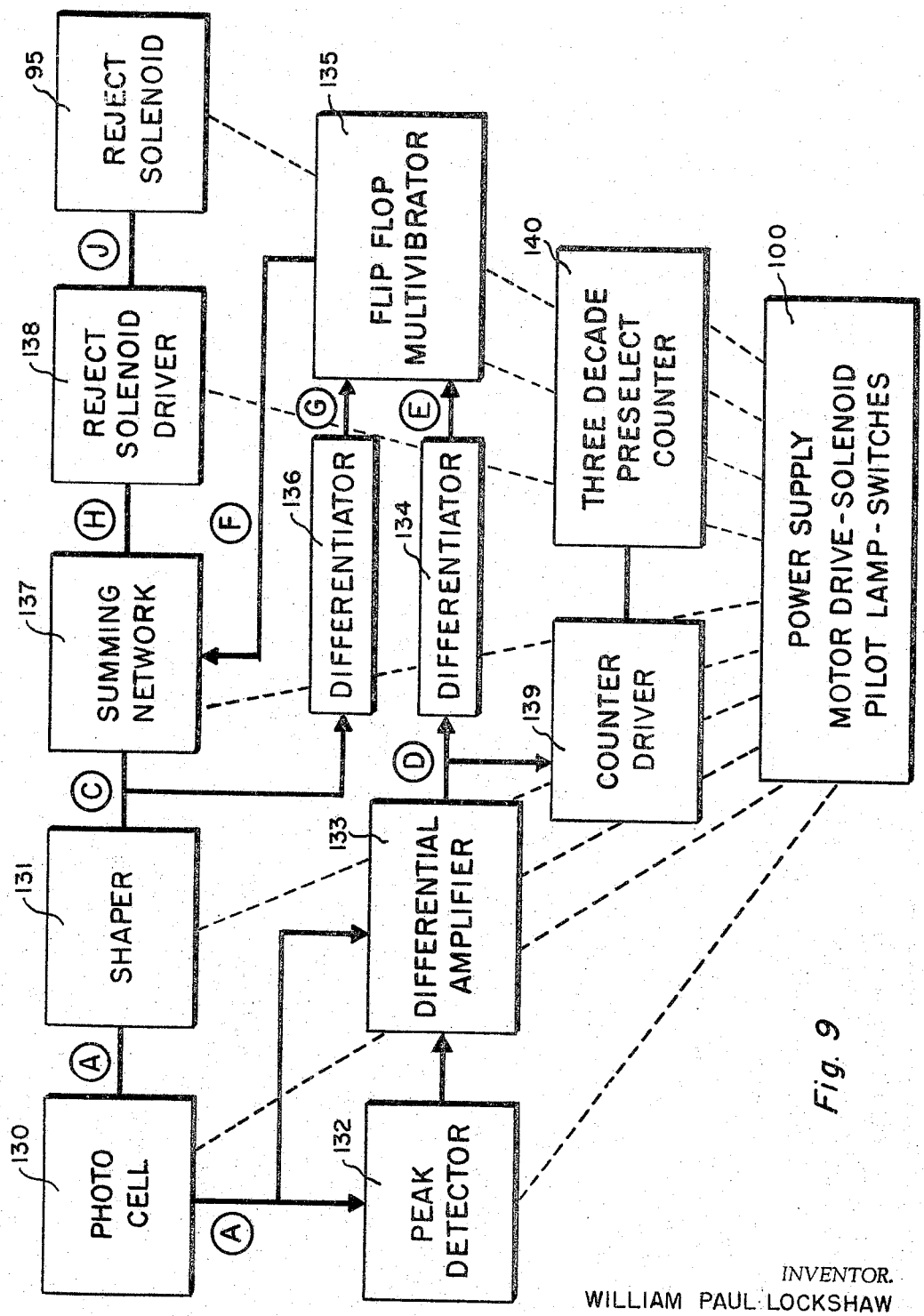
FIG. 9 is a block diagram of one form of electronic control circuit forming a part of the present invention.
Figure 11:
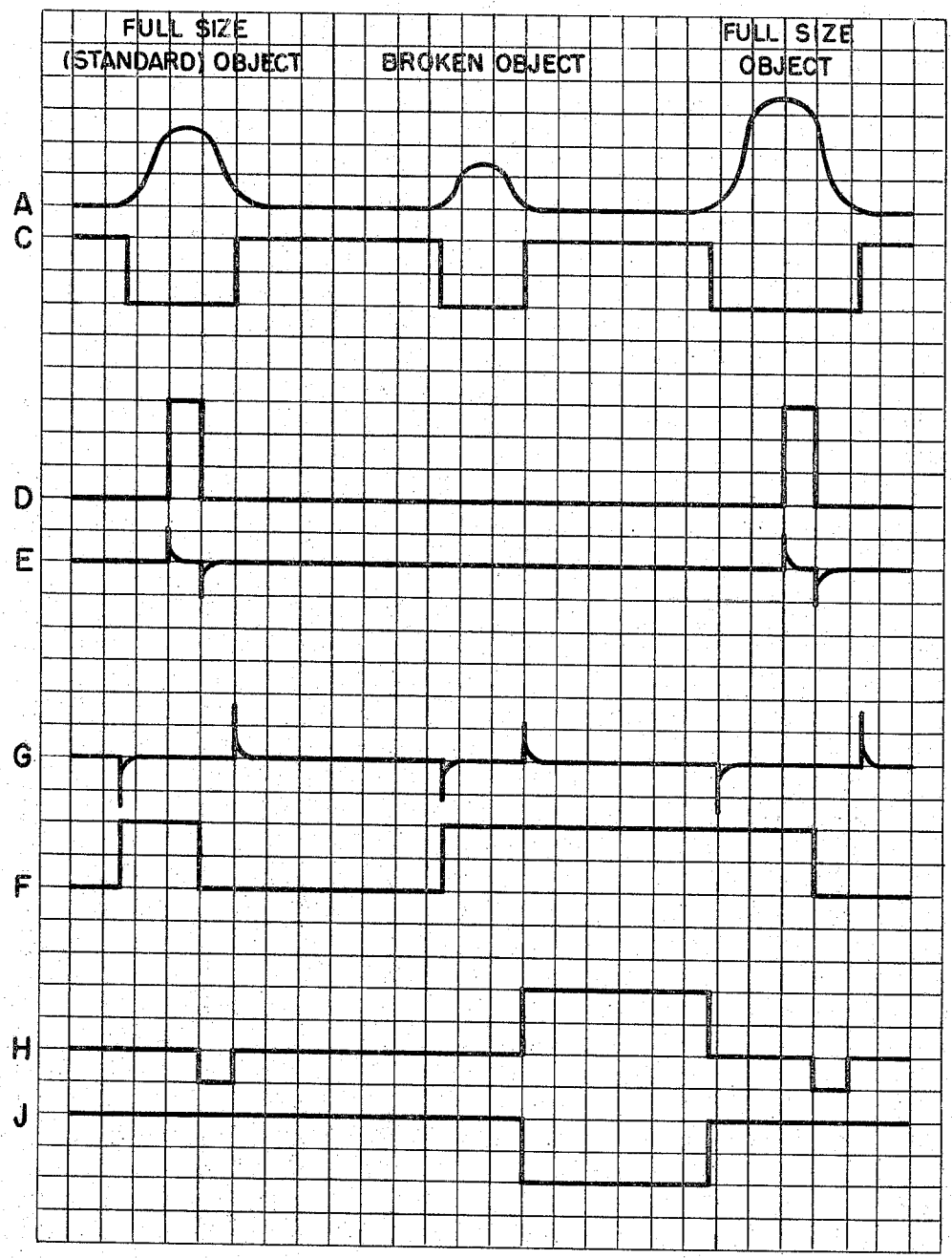
FIG. 11 is a diagrammatic illustration of wave forms present in the circuit shown in FIGS. 9 and 10.

The counting and discriminating mechanism is formed of a plurality of individual circuits, to wit: a photocell circuit 130, a shaper circuit 131, a peak detector circuit 132, a differential amplifier circuit 133, a first differentiator circuit 134, a flip-flop multivibrator circuit 135, a second differentiator circuit 136, a summing network 137, a reject solenoid and driver circuit 138, a counter driver circuit 149, a three decade preselect counter 140, and the power supply indicated generally at 120 (see FIGS. 9 and 10). The momentary start switch includes contacts S–1b which serve to connect the three decade preselect counter 140 directly with the power supply 120 through line L–8 and connector N to reset the counter 140 when the operation is started. In its normal position, switch S–1b connects the three decade preselect counter 140 directly with the counter driver 139. As those skilled in the art will readily appreciate, each individual circuit referred to above is, in and of itself, a conventional, well known electronic structure, utilizing readily available components, notably resistors, condensers, transistors and diodes, in known configuration and arrangements. For example, the photocell circuit 130 is a conventional photocell circuit capable of producing a positive output which is directly proportional to the cross section of an object passing through the beam of light falling on the photocell 25. In combination, however, these circuit elements coact one with the other to produce a new, useful and unobvious result in the substantially instantaneous counting and discrimination of individual discrete objects. For use in connection with the present disclosure, FIG. 10 is one illustrative schematic wiring diagram showing in more detail illustrative elements of the type diagrammatically illustrated in FIG. 9 and referred to herein. FIG. 11, furthermore, illustrates wave configurations of the outputs of the various elements shown in FIG. 9.

Referring to the organization of electronic components as shown in FIG. 9, and as illustrated schematically in somewhat more detail in FIG. 10, as the first object falls through the light beam L, it blocks an amount of light proportional to its cross-sectional area, thereby causing the output of the photocell 25 to change in the same proportion. This change results in an output from the photocell circuit 130 of a positive wave A (shown at A in FIG. 11), the form of this wave A being proportional to the cross-sectional area of the object. The output wave from each circuit shown in FIG. 9 is designated by an arabic letter enclosed in a circle.

In order to produce a negative square wave having a time duration equal to the time duration of the photocell circuit output A, the photocell circuit 130 is coupled to a shaper circuit 131, composed essentially of an amplifier and Schmitt trigger. As shown in FIG. 11, the output wave C of the shaper circuit 131 is a square wave having a time duration equal to the time duration of the pulse out of the photocell 25.

The shaper output wave C is differentiated, by the differentiator 136, to produce wave G having a negative leading edge and a positive lagging edge. The leading edge of wave G triggers the flip-flop multivibrator circuit 135 so that the output potential thereof is about zero volts. This output potential is summed with the output potential of the shaper circuit, which is also near zero volts, in the summing circuit 137, to produce wave H. The summed voltage is connected to the reject solenoid driver 136, but under the given conditions, is insufficient to cause the reject solenoid drive circuit to operate the solenoid 95. As a result, the object P continues to fall and is counted, as herein described.

To establish a standard for comparison, as well as to actuate the counter, the output A of the photocell circuit 130 is coupled to the peak detector circuit 132 which holds a charge voltage proportional to the output of photocell circuit when a standard object crosses the light beam L. This charge voltage is transferred to one input of the differential amplifier circuit 133 thereby to place a charge in the differential amplifier circuit 133 which is proportional to the size of the standard pill of object. At the same time, the output A of the photocell circuit is directly connected to the other input of the differential amplifier circuit 133. In this manner, a standard charge is fed to the differential amplifier circuit 133 while a charge directly proportional to the cross-sectional area of an object passing the photocell is also fed to that circuit, and the two charges are compared therein. If both are of equal potential, an indication that an object passing the photocell meets the selected standard, a square wave D is produced at the output of the differential amplifier 133. This square wave D (FIG. 11), being positive, places a corresponding positive charge in the counter driver circuit 129, which in turn completes a circuit through switch S–1b to the counter 140. The counter is a conventional three decade preselect counter shown schematically in FIG. 10. When the object passing the photocell does not meet the standard previously established, no wave D is produced by the differential amplifier 133 and the counter driver circuit 139 is not actuated.

For use in determining whether the reject solenoid is actuated, the square wave D from the differential amplifier circuit is differentiated by differentiator circuit 134 to produce wave E having a leading edge and a trailing edge (FIG. 11). As mentioned above, the shaper output wave C is differentiated by differentiator 136 to produce wave G having a negative leading edge and a positive lagging edge. Differentiated waves E and G are fed into a conventional flip-flop multivibrator circuit 135. The leading edge of wave G triggers the flip-flop multivibrator circuit 135 to produce an output of about zero volts. It will be appreciated at this point that any pill or object passing the photocell will result in the presence in the circuit of wave G having a negative leading edge and a positive lagging edge. However, only the presence of a standard pellet will result in the presence in the circuit of wave E having a positive leading edge and a negative lagging edge. Thus, when a standard pill passes the photocell, the lagging edge of wave E, being negative, will subsequently trigger the flip-flop so that the output of the flip-flop multivibrator 135 will return to a negative voltage. This results in output wave F from the flip-flop multivibrator 135. When the flip-flop multivibrator is triggered by the leading negative edge of wave G, the output goes to zero as shown in wave F. This potential is summed with the output of the shaper wave C which is also near zero volts. The summed voltage, wave H, is connected to the reject solenoid driver circuit 138, but output H is insufficient to cause the reject circuit to operate, and thus the output J of the reject solenoid circuit remains near zero volts. After the pill has passed the photocell, the wave output C from the shaper returns to a positive voltage. If the pill is a standard pill, the wave output from the flip-flop circuit 135, triggered by the lagging edge of wave E returns to a negative voltage. The sum of waves C and F (wave H) becomes zero or very slightly negative, again insufficient to cause the reject solenoid circuit (wave J) to operate.

If, however, the object passing the photocell is broken or smaller than the standard, the reject baffle 85 is actuated, the differential amplifier 133 will not operate to produce a wave D and thus no wave E will be produced, and the counter will not be actuated. This result occurs when a broken object passes through the light beam L, because the peak output of the photocell circuit 130 is not sufficient to bring the differential amplifier circuit into conduction because of the stored charge in the peak detector circuit 132 caused by the previous standard size object. As a result, there is no output pulse D from the differential amplifier circuit 133. The counter driver circuit 139 will not be actuated and the flip-flop circuit 135 will not be triggred, and it will remain in condition such that its output F will remain near zero volts and will not return to a negative value. When the broken object has passed the photocell 25, the output C of the shaper circuit 131 becomes positive and the summed voltage at the summing circuit 137, producing wave H, will also be positive. This positive change H will energize the reject solenoid driver circuit 138 to actuate the reject solenoid 95 and swing the reject gate or baffle 85 into the path of the falling broken object. The reject solenoid circuit 138 stays energized (wave J) until a standard sized object triggers the differential amplifier and resets the flip-flop.

When the counter reaches the preset count, relay solenoid K–2 is energized, thereby opening switch K–2a, de-energizing the complete circuit, and closing switch K–2b to momentarily lock-in relay solenoid K–2. This removes all power from the unit, the feed cylinders 34, 35 spread apart, and any objects remaining between the cylinders or in the feed hopper drop through the return hopper 60 to the return container.

Other forms of conveyor mechanism operative to align a plurality of discrete objects into a single line array will doubtless occur to those skilled in the art. For example, instead of the counter rotating cylinders, a vibrator will find utility. Utilizing a slight downward slope from the hopper to the photocell station, with appropriate baffles or guides, and a vibrator to supply motive power, the objects can be simply and easily aligned in a single file array. Moreover, other forms of electro-mechanical circuits embodying the foregoing principles and features will doubtless occur to those skilled in the art upon reading this specification. Accordingly, I wish to be limited only by the scope of the claims appended hereto.

I claim:

1. A machine for discriminatingly counting discrete objects comprising, in combination, a hopper containing a supply of said objects, means for conveying a straight line array of objects from said hopper, means for sensing a selected physical property of each object in said array, said sensing means including means for sensing the said physical property of a standard object and establishing said property as a standard, means for comparing the said physical property of each successive object in said array with said established standard, means for rejecting an object the said physical property of which does not meet said standard, means for counting each object the said physical property of which meets said standard, means for presenting said counting means to a preselected count, means for stopping said machine when the counter reaches said preseltced count, and means operative in response to said counter reaching said preselected count for discharging all objects remaining in said array and said hopper.

2. A machine for discriminatingly counting discrete objects comprising, in combination, a hopper containing a supply of said objects, means for conveying a single line array of objects from said hopper, including a pair of externally threaded justaxposed parallel cylinders defining an object receiving groove therebetween, means for sensing a selected physical property of each obpect in said array, said sensing means including means for sensing the said physical property of a standard object and establishing said property as a standard, means for comparing the said physical property of each successive object in said array with said established standard, means including a solenoid actuated baffle for rejecting an object the said physical property of which does not meet said standard, means for counting each object the said physical property of which meets said standard, means for presetting said counting means to a preseletced count, means for stopping said machine when the counter reaches said preselected count, and means operative in response to said counter reaching said preselected count for separating said cylinders to discharge all objects remaining in said array and said hopper.

3. A machine for discriminatingly counting discrete objects comprising, in combination, a hopper containing a supply of said objects; means for conveying a single line array of objects from said hopper, said conveying means comprising a pair of parallel cylindrical members arranged in juxtaposed parallel axial arrangement to define an object receiving groove therebetween, said hopper being positioned above said groove at one end of said cylinders, means defining external spiral threads on said cylinders of gradually increasing pitch from the hopper end to the discharge end thereof, and means for rotating said cylinders in opposite directions whereby said threads convey objects form said hopper in said groove in a single line array; means for sensing a selected physical property of each object in said array, said sensing means including means for sensing the said physical property of a standard object and establishing said property a standard; means for comparing the said physical property of each successive object in said array with said established standard; means for rejecting an object the said physical property of which does not meet said standard; means for counting each object the said physical property of which meets said standard, including means for presetting said counting means to a preselected count; and means operative in response to said counter reaching said preselected count for separating said parallel cylinders to discharge all objects remaining in said array and said hopper.

4. A counting and discriminating device for use in comparing discrete objects to a preselected standard and for counting objects having a cross-sectional area at least equal to that of said standard, said device comprising, in combination, photocell means for producing a positive output wave proportional to the cross-sectional area of the object, peak detector means for establishing and holding a potential proportional to the cross-sectional area of a selected standard object, shaper means for producing a negative square wave having a time duration equal to the time duration of the output wave from the photocell means and a minimum output potential of about zero volts, means for differentiating said shaped wave to produce a wave having a negative leading edge and a positive lagging edge, flip-flop multivibrator means triggered by the leading edge of said differentiated shaped wave to produce an output wave having a maximum output potential of about zero volts, differential amplifier means for comparing the photocell output to said peak detector potential and for producing an output wave when said photocell output is equal to or greater than said peak detector potential, a counter, a counter driver actuated by said differential amplifier output wave for actuating said counter, means for differentiating said differential amplifier output wave to produce a wave having a positive leading edge and a negative trailing edge, said trailing edge triggering said flip-flop multivibrator means to produce a negative potential output, means for summing said shaper potential and said flip-flop multivibrator potential, a reject solenoid, reject solenoid driver means operative in response to a positive potential sum from said summing means to operate said reject solenoid and thereby to reject an object having a cross-section less than that of the standard, and means operative in response to said counter reaching a preselected count for terminating the operation of the device.

5. A counting and discriminating device for use in comparing discrete objects to a preselected standard and for counting objects having a cross-sectional area at least equal to that of said standard, said device comprising, in combination, photocell means for producing a positive output wave proportional to the cross-sectional area of the object, peak detector means for establishing and holding a potential proportional to the cross-sectional area of a selected standard object, differential amplifier means for comparing the photocell output to said peak detector potential for producing an output wave when said photocell output is equal to or greater than said peak detector potential, counter, a counter driver actuated by said differential amplifier output wave for actuating said counter, and means operative in response to said counter reaching a preselected count for terminating the operation of the device.

6. A device for use in comparing discrete objects to a preselected standard and for counting objects which measure up to said standard, said device comprising, in combination, photocell means for producing a positive output wave proportional to a physical property of the object, peak detector means for establishing and holding a potential proportional to the said physical property of a selected standard object, differential amplifier means for comparing the photocell output to said peak detector potential and for producing an output when said photocell output is equal to or greater than said peak detector potential, and counting means operative in response to said differential amplifier output for counting said object causing the same.

7. A device for use in comparing discrete objects to a preselected standard and for rejecting objects failing to measure up to said standard, said device comprising, in combination, photocell means for producing a positive output wave proportional to a physical property of the object, peak detector means for establishing and holding a potential proportional to the said physical property of a selected standard object, shaper means for producing a negative square wave having a time duration equal to the time duration of the output wave from the photocell means and a minimum output potential of about zero volts, means for differentiating said shaped wave to produce a wave having a negative leading edge and a positive lagging edge, flip-flop multivibrator means triggered by the leading edge of said differentiated shaped wave to produce an output wave having a maximum output potential of about zero volts, differential amplifier means for comparing the photocell output to said peak detector potential and for producing an output wave when said photocell output is equal to or greater than said peak detector potential, means for differentiating said differential amplifier output wave to produce a wave having a negative trailing edge for triggering said flip-flop multivibrator means to produce a negative potential output, means for summing said shaper potential and said flip-flop multivibrator potential, a reject solenoid, and reject solenoid driver means operative in response to a positive potential sum from said summing means to operate said reject solenoid thereby to reject an object the said physical property of which does not measure up to that of said standard.

8. A device for use in comparing discrete objects to a preselected standard, for counting objects measuring up to said standard, and for rejecting objects failing to measure up to said standard, said device comprising, in combination, photocell means for producing a positive output wave proportional to a physical property of the object, peak detector means for establishing and holding a potential proportional to the said physical property of a selected standard object, shaper means for producing a negative square wave having a time duration equal to the time duration of the output wave from the photocell means and a minimum output potential of about zero volts, means for differentiating said shaped wave to produce a wave having a negative leading edge and a positive lagging edge, flip-flop multivibrator means triggered by the leading edge of said differentiated shaped wave to produce an output wave having a maximum output potential of about zero volts, differential amplifier means for comparing the photocell output to said peak detector potential and for producing an output wave when said photocell output is equal to or greater than said peak detector potential, a counter, counter driver means actuated by said differential amplifier output wave for actuating said counter, means for differentiating said differential amplifier output wave to produce a wave having a negative trailing edge for triggering said flip-flop multivibrator means to produce a negative potential output, means for summing said shaper potential and said flip-flop multivibrator potential, a reject solenoid, and reject solenoid driver means operative in response to a positive potential sum from said summing means to operate said reject solenoid thereby to reject an object the said physical property of which does not measure up to that of said standard, and means operative in response to said counter reaching a preselected count for terminating the operation of the device.

References Cited
UNITED STATES PATENTS

| | | | |
|---|---|---|---|
| 690,876 | 1/1902 | Reeves. | |
| 1,604,133 | 10/1926 | Rebechini | 209—73 |
| 2,627,347 | 2/1953 | Power | 209—74 X |
| 2,675,917 | 4/1954 | Power | 209—111.7 |
| 3,075,641 | 1/1963 | Hutter et al. | 209—111.5 X |
| 3,099,749 | 7/1963 | Williams | 88—14 |
| 3,189,178 | 6/1965 | Calleson et al. | 209—74 X |
| 3,207,909 | 9/1965 | Lakso et al. | 250—223 |

M. HENSON WOOD, JR., *Primary Examiner.*

J. N. ERLICH, *Assistant Examiner.*